US006618644B2

(12) United States Patent
Bean

(10) Patent No.: US 6,618,644 B2
(45) Date of Patent: Sep. 9, 2003

(54) BATTERY RECYCLING

(75) Inventor: Heather N. Bean, Fort Collins, CO (US)

(73) Assignee: Hewlett-Packard Company, LP., Houston, TX (US)

( * ) Notice: Subject to any disclaimer, the term of this patent is extended or adjusted under 35 U.S.C. 154(b) by 0 days.

(21) Appl. No.: 10/032,356

(22) Filed: Dec. 21, 2001

(65) Prior Publication Data

US 2003/0120380 A1 Jun. 26, 2003

(51) Int. Cl.[7] ............................................... G06F 17/00
(52) U.S. Cl. ....................................................... 700/231
(58) Field of Search .......................................... 700/231

(56) References Cited

U.S. PATENT DOCUMENTS 5,694,019 A * 12/1997 Uchida et al. ............. 320/106
6,154,006 A * 11/2000 Hatanaka et al. ........... 320/109
6,157,315 A * 12/2000 Kokubo et al. ............ 340/5.42

* cited by examiner

*Primary Examiner*—Christopher P. Ellis
*Assistant Examiner*—Richard Ridley

(57) ABSTRACT

An apparatus and a method provide a convenient way for consumers to recycle used batteries. The apparatus is a self-contained station or kiosk that accepts used batteries from a consumer and dispenses one or both of fully charged batteries and credit for the used battery to the consumer. The method determines one or more of chemistry, rechargeability and condition of the used battery, assigns a credit value to the used battery, and dispenses a form of credit based on the assigned credit value. The present invention recycles one or both of used rechargeable and used non-rechargeable batteries and separately dispenses fully charged batteries. Used rechargeable batteries are recharged and reused, and used non-rechargeable batteries are collected for proper disposal according to regulations.

27 Claims, 4 Drawing Sheets

BATTERY RECYCLING

TECHNICAL FIELD

This invention relates to battery technology. In particular, the invention relates to recycling batteries.

BACKGROUND OF THE INVENTION

Electronic devices capable of deriving operating power from one or more batteries are popular, widely available and in widespread use. Many of these electronic devices would be much less successful and even lose much of their market viability without the availability of reliable battery power. In particular, portable electronic devices generally depend on batteries as a primary power source. For example, popular portable electronic devices, such as notebook and laptop computers, hand-held computers and personal digital assistants (PDAs), digital cameras, portable AM/FM radios and CD/cassette music players, and cellular telephones would be of little or no use without battery power.

Electronic devices that employ batteries can use batteries as either a primary power source or as a secondary power source. In some cases, the electronic device is powered entirely by DC power supplied by a battery. In other cases, the battery powered electronic device can be operated either using battery power or using an external DC or AC power source. Generally, an AC adapter that converts the AC into DC provides the external DC power source for those electronic devices that use external DC power. The external AC/DC power source is also commonly used for recharging batteries in portable electronic devices that utilize in-situ rechargeable battery cells. Otherwise, rechargeable batteries generally are recharged using a separate battery charger that may be purchased by a user to recharge rechargeable batteries. Unfortunately, the initial cost associated with purchasing the battery charger can be high. In fact, for some users the expense of purchasing the battery charger is prohibitive.

Further, it is typical in many applications for the user to carry a second set of charged rechargeable batteries for convenient uninterrupted use of the device. Using the separate battery charger, the first set of batteries can be recharged while the second set is being used. However, the initial cost of rechargeable batteries is also relatively expensive. Moreover when traveling, the user must often carry the portable electronic device as well as various accessories in addition to the battery charger and the extra set of rechargeable batteries. When extra batteries and a battery charger are included, the number of accessories can become cumbersome to carry or transport. Therefore, as an alternative, many users opt to use non-rechargeable batteries in their portable electronic devices, especially when traveling, and forego the purchase and/or use of the battery charger and the extra set of rechargeable batteries, for both cost and portability convenience.

Concomitant with the trend toward, and popularity of, the use of non-rechargeable batteries are the problems associated with their inevitable disposal when these batteries no longer provide sufficient charge to power the electronic device. Battery waste is an ever-growing problem for the environment worldwide. In fact, the problem is so severe in some parts of the world that the approach chosen to control the waste stream of consumed non-rechargeable batteries often includes restricting the sale of batteries, especially the non-rechargeable varieties.

The disposal of non-rechargeable batteries is not the only problem with respect to battery waste production. Many consumers dispose of nickel-based rechargeable batteries, such as Nickel-Metal-Hydride (NiMH) and Nickel-Cadmium (NiCd) batteries, long before the end of their useful life due to a lack of understanding of the 'memory effect' that is endemic to their chemistry. Moreover, many rechargeable batteries can be reconditioned and reused many times before their useful life has actually expired.

The use of rechargeable batteries is preferable to using non-rechargeable batteries from a battery waste stream standpoint. Furthermore, recycling batteries and their constituent elements is preferable to disposal. Clearly, reuse of rechargeable batteries is the best form of recycling. Educated consumers using rechargeable batteries to their optimum life inevitably will postpone the point in time when the rechargeable batteries should be thrown away. More importantly, these educated consumers effectively will reduce the consumption of single-use, non-rechargeable batteries and thus reduce waste.

Thus it would be advantageous to provide convenient battery recycling for consumers. Battery recycling could slow down the endemic battery disposal mindset and reduce the rate at which batteries enter the waste stream.

SUMMARY OF THE INVENTION

The present invention is an apparatus and method for recycling batteries. The recycling apparatus is a self-contained battery recycling station, kiosk or vending machine that may be either manned or unmanned. The apparatus comprises a receptacle, a dispenser and a controller that monitors the receptacle and controls the dispenser. The apparatus accepts used or discharged batteries from consumers at the receptacle and dispenses one or both of fully charged batteries and credit for the used battery to the consumer from the dispenser. The method tests the used battery to determine chemistry, rechargeability and condition, assigns a credit value to the used battery, and dispenses one or both of a fully charged battery and credit for the used battery. The present invention accepts one or both of used rechargeable and used non-rechargeable batteries. Used rechargeable batteries are recharged and reused and used non-rechargeable batteries are collected for disposal in a proper fashion. The present invention further dispenses one or both of rechargeable and non-rechargeable batteries. Preferably, the dispensed batteries are rechargeable batteries to encourage a consumer to use rechargeable batteries instead of non-rechargeable batteries. These recycling stations, kiosk or vending machines can be placed at convenient locations to make them readily accessible to the consumer.

In one aspect of the present invention, an apparatus for recycling a used battery is provided. The apparatus comprises a consumer access point where the used battery is deposited by a consumer, a battery tester that measures a characteristic of the used battery to determine rechargeability of the used battery, a dispenser that dispenses a form of credit, where the credit has a value that based on the determined rechargeability, and a controller that communicates with the consumer at the consumer access point. The controller controls the operation of the battery tester and the dispenser in response to an input at the consumer access point. Preferably, the apparatus further comprises a battery charger that recharges used rechargeable batteries. Furthermore, the battery charger may also maintain the charge of batteries stored by the apparatus so that the stored rechargeable batteries remain at a peak or maximum charge level.

The consumer access point comprises a plurality of ports for depositing used batteries and payments and for receiving credit in the form of a fully charged battery or the credit value. The consumer access point further comprises a display. The controller communicates with the consumer using the display.

In the preferred embodiment of the apparatus comprising the battery charger, the battery charger recharges and reconditions a used rechargeable battery into another fully charged battery that later can be dispensed. The controller controls the battery charger and monitors the recharge/reconditioning cycle.

In another aspect of the invention, a method of recycling a battery is provided. The method comprises electrically testing a used battery to determine one or more of battery chemistry, rechargeability and condition of the used battery. The method further comprises assigning a credit value to the tested used battery based on the determined chemistry, rechargeability and condition, and dispensing a form of credit based on the assigned credit value. In a preferred embodiment, the method still further comprises recharging the used battery into a fully recharged battery, when the electrical testing determines that the used battery is rechargeable.

In some embodiments, the step of dispensing a form of credit comprises providing options and choices for the form of dispensed credit. One option that may be provided is a choice between dispensing the credit in the form of a refund and applying the credit to a purchase of a fully charged battery that is dispensed. The refund can be in the form of money, tokens or coupons, for example. The option to purchase the fully charged battery includes a choice among a plurality of different form factors for the fully charged battery. In some of these embodiments, the fully charged battery comprises only rechargeable battery types. In others of these embodiments, the fully charged battery comprises one or both of rechargeable and non-rechargeable battery types. Where a choice between both battery types is provided, the method optionally further comprises providing an incentive for choosing a rechargeable battery over a non-rechargeable battery.

Advantageously, the present invention allows convenient use of rechargeable batteries in much the same way as consumers currently use non-rechargeable batteries. The present invention ultimately will reduce the consumption of single-use, non-rechargeable batteries and thus reduce waste. Single-use, non-rechargeable batteries that are collected by the present invention are properly disposed of, such that the number of such single-use batteries entering landfills is reduced. Further, the present invention can lower the consumer price barrier to rechargeable batteries by providing an alternative to the consumer to that of investing in both a rechargeable battery and a battery charger all at once. The present invention further provides convenient fully charged and properly conditioned rechargeable batteries to the consumer that both promotes use of a rechargeable battery to its designed capacity and reduces prematurely discarding the rechargeable battery. The present invention can be provided at convenient locations, such as malls, stores, popular tourist areas, and other public places. Its availability can be much like 'propane bottle exchange stations' that currently exist at grocery and some department stores. In contrast to the propane bottle exchange stations, the present invention can be unmanned or manned, and therefore, made available to the consumer for additional time and in more locations, thereby enhancing the overall convenience of the present invention.

The present invention provides a disciplined use and disposal of batteries that are better for the environment than current practices provide. Moreover, the present invention promotes recycling and provides opportunity for profitable battery recycling that can be more profitable than the sale of a single battery charger. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
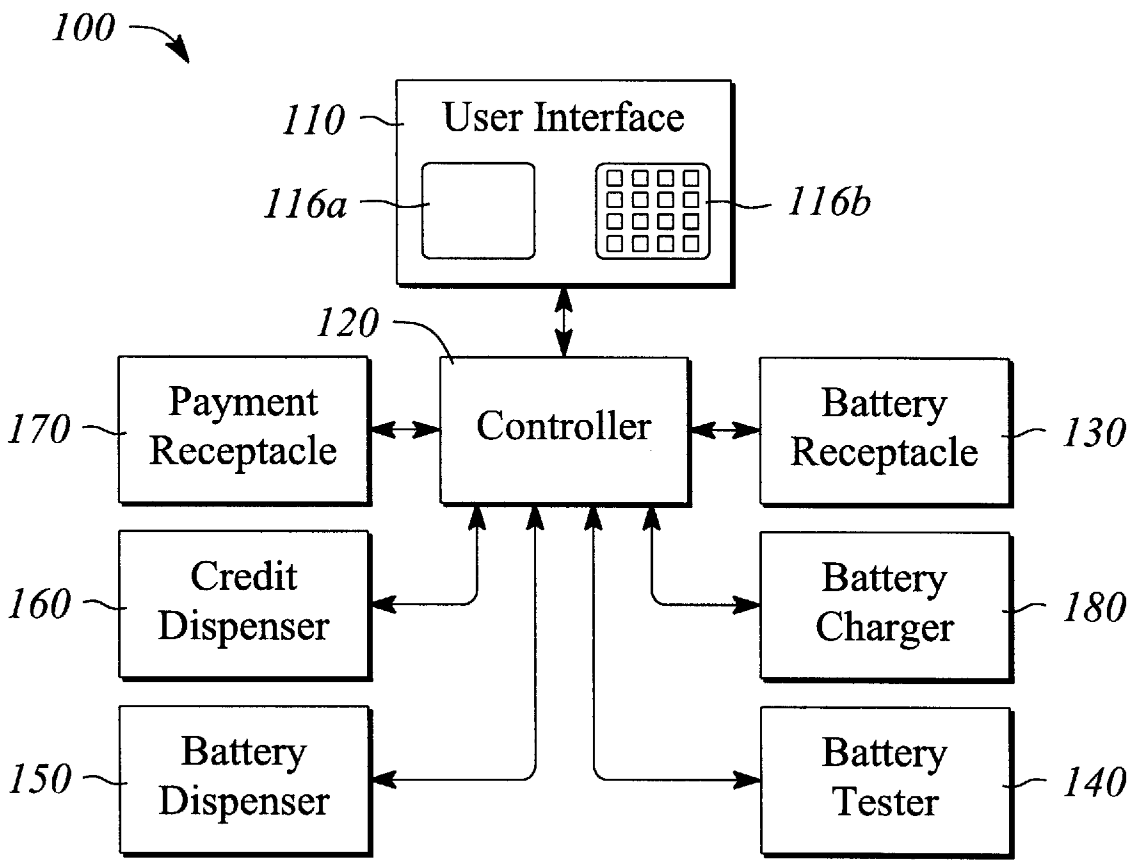
FIG. 1 illustrates a block diagram of an apparatus for recycling a battery ccording to the present invention.

The apparatus and method of the present invention provide for recycling batteries. In particular, the apparatus is a self-contained battery recycling station, kiosk or vending machine that may be either manned or unmanned. The apparatus can be placed in various locations within a metropolitan area thus providing ready access to the consumer. The method tests the used battery to determine chemistry, rechargeability and condition, assigns a credit value to the used battery, and dispenses one or both of a fully charged battery and credit for the used battery. The present invention accommodates both rechargeable and non-rechargeable batteries. Rechargeable batteries are reconditioned and dispensed for reuse by the consumer as a primary way of recycling. Non-rechargeable batteries and rechargeable batteries that have reached the end of their useful life are stored in the apparatus for latter disposal or recycling of their constituent elements using an appropriate conventional means.

In simple terms, a battery is a device that converts chemical energy into electricity. A variety of battery types that have application to powering electronic devices are commercially available. Batteries can be divided into two broad classes depending on whether the battery is rechargeable or non-rechargeable. The distinction between rechargeable and non-rechargeable batteries is often important since attempting to recharge non-rechargeable batteries can lead to venting or leaking of electrochemical materials, and in extreme cases can result in dangerous explosions.

Directly related to whether or not a battery is rechargeable is the particular battery chemistry that is employed. The 'chemistry' of the battery refers to the specific combination of electrolytes and electrode materials used in the battery to create the chemical reaction that produces electrical power. Several battery chemistries, some of which produce rechargeable batteries and some of which produce non-rechargeable batteries, are in use and commonly available.

A common battery chemistry used for electronic devices is the well-known alkaline battery. The standard alkaline battery employs an alkaline gel, usually potassium hydroxide, as an electrolyte. The positive electrode is normally made of magnesium dioxide and the negative electrode is typically made of zinc. Other battery chemistries commonly used to power electronic devices include but are not limited to high-drain alkaline, high-energy lithium, NiMH and NiCd. Of these, normally only batteries having NiMH or NiCd chemistries are rechargeable while the others are generally not rechargeable.

Batteries of different chemistries generally have different electrical properties such as open-circuit voltage, charge capacity, and peak current capacity. These electrical properties are a direct result of the characteristics of the chemical reactions taking place within the batteries. The unique characteristics of a chemical reaction such as rate, reaction path, and reactants involved are sometimes referred to collectively as the reaction's 'kinetics'.

In general, consumer batteries are most often classified based on the physical size and shape of the battery and only secondarily on chemistry and rechargeability. The physical size and shape of a battery is sometimes referred to as the 'form-factor' of the battery. Many battery chemistries are available in more than one form-factor. More to the point, some of the popular form-factors are available in more than one battery chemistry. Thus, even though different chemistries have different kinetics and rechargeability characteristics, the form-factor of the battery may not reflect any difference between the characteristics at all.

Electronic devices are available that utilize batteries having a wide variety of different form-factors. Both standard form-factors and custom form-factors are in common use. Available standard form-factors include but are not limited to AA, AAA, C, D and 9 Volt cells. Additionally, many of the commercially available consumer battery chemistries can be found in more than one of the standard form-factors. Custom battery form-factors include customized single cells as well as specialized battery packs that contain more than one cell. A battery or battery pack having a customized form-factor is sometimes referred to as an 'application-specific' battery. Specialized application-specific battery packs and custom form-factors are most typically associated with battery chemistries that are rechargeable, though non-rechargeable battery types are available in some non-standard form-factors as well.

The present invention is particularly directed to recycling standard form-factor batteries, such as the commonly used AA, AAA, C, D and 9 Volt cells. However, it is within the scope of the present invention to include recycling of specialized battery packs and custom form-factors batteries as well. The discussion below is focused on recycling the commonly used form factor batteries, which the inventors believe have a greater impact on our environment due to their wide use. This discussion is not intended to limit the scope of the present invention in any way.

FIG. 1 illustrates a block diagram of an apparatus 100 for recycling a used battery according to the present invention. The apparatus 100 comprises a consumer access point 110, a controller 120, a battery receptacle 130, a battery tester 140, a battery dispenser 150, and a credit dispenser 160. In some embodiments, the apparatus 100 further comprises a payment receptacle 170 and/or a battery charger 180. The apparatus 100 dispenses either or both of a fully charged battery and a credit at the consumer access point 110. The credit may take the form of money, tokens or coupons, for example. Furthermore, money may take the form of one or more of cash, a coupon redeemable for cash or merchandise, or an electronic funds transfer to an account of the consumer, such as through the use of a credit/debit card account. The controller 120 controls the operation of the battery receptacle 130, the battery tester 140, the battery dispenser 150, and the credit dispenser 160, and preferably, the payment receptacle 170, and the battery charger 180, in response to an input at the consumer access point 110.

Figure 2:
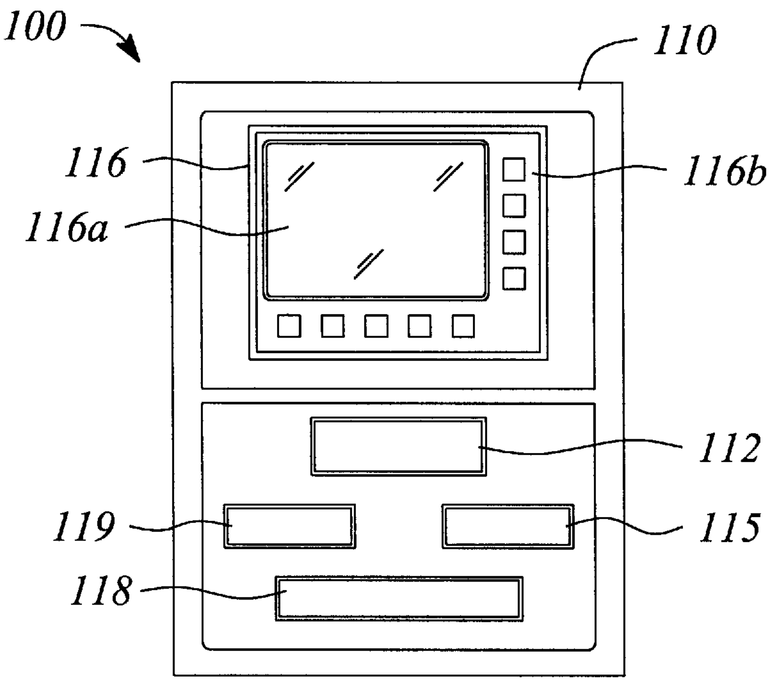
FIG. 2 illustrates a front view of an embodiment of the apparatus of FIG. 1 showing a consumer access point.

FIG. 2 illustrates in more detail the consumer access point 110 of the apparatus 100 according to some embodiments. The consumer access point 110 comprises a battery receptacle port 112 for depositing a used or discharged battery, an optional payment receptacle port 115 for depositing a payment, a user interface 116, a battery dispensing port 118, and a credit dispensing port 119. The controller 120 communicates with a consumer using a display **116*a* of the user interface 116. The user interface 116 further comprises buttons or keys 116*b* for use by the consumer to communicate with the controller 120. The apparatus 100 provides an option to the consumer to receive either a fully charged battery or credit in exchange depositing the used battery at the consumer access point 110. The apparatus 100 further provides a selection of fully charged batteries from which the consumer may choose. The display 116*a*** displays the options and the choices to the consumer, including information about the cost of a fully charged battery and any balance due amount needed to purchase the fully charged battery.

To operate the apparatus 100, a consumer inserts a used or discharged battery into the battery receptacle port 112. The battery receptacle port 112 is connected to the battery receptacle 130 that is associated with the battery tester 140. The inserted battery is received by the battery receptacle 130 and either transferred to or simply tested by the battery tester 140. The battery tester 140 electrically tests the battery under the direction of the controller 120. The electrical test may be used to determine battery chemistry, rechargeability and general condition of the battery. The controller 120 processes results of the electrical test and assigns a credit value to the inserted battery based on the determined chemistry, rechargeability and condition of the battery.

The controller 120 communicates the results of the test and credit assignment to the consumer by displaying the credit value, the option for receiving credit or a fully charged battery, a list of battery form factors and costs for the selection of fully charged batteries from which the consumer can choose, and any balance due amount for a selected fully charged battery on the display **116*a* of the user interface 116. The consumer responds by pressing the appropriate buttons 116*b* associated with the user interface 116 at the consumer access point 110. If credit is chosen, the controller 120 directs the credit dispenser 160 to dispense the credit amount to the credit dispenser port 119 of the consumer access point 110. The credit can be in the form of one or more of money, coupons or tokens, for example. If the fully charged battery is chosen, the consumer selects a battery to purchase and deposits a balance due amount at the payment receptacle port 115. When the balance due amount is deposited, the controller 120 directs the battery dispenser 150 to dispense the selected, fully charged battery to the battery dispenser port 118 of the consumer access point 110. FIG. 2 illustrates the apparatus 100 according to some embodiments that further illustrates the plurality of ports 112, 115, 118, 119 at the consumer access point 110**.

The battery dispenser 150 comprises a plurality of fully charged batteries in a plurality of form factors. In some embodiments, the apparatus 100 provides the plurality of form factors in only a rechargeable battery type to encourage the consumer to use rechargeable batteries and further, to encourage reuse of the apparatus 100 to dispose of used or discharged rechargeable batteries. In this way, rechargeable batteries can be repeatedly recharged and reconditioned to their designed capacity, thus reducing the number of rechargeable batteries that are prematurely discarded. In some other embodiments, the apparatus 100 provides an option for either a rechargeable type battery or a non-rechargeable battery type in the plurality of form factors. The plurality of fully charged batteries is stored in the battery dispenser 150. Where this option is provided, the list of fully charged batteries available includes the form factors and cost for both of the rechargeable type and the non-rechargeable type batteries. In these other embodiments, the controller 120 also displays the option of choosing a rechargeable type battery or non-rechargeable type battery, when the fully charged battery option is chosen.

The apparatus 100 may further provide an incentive for choosing a fully charged rechargeable type battery to encourage the use of rechargeable type batteries. Where this incentive is provided, the controller 120 displays the incentive to the consumer when the option for battery type is displayed. Moreover, the apparatus 100 may further provide an incentive to use the apparatus 100 for battery recycling in the future. Where this reuse incentive is provided, the controller 120 displays the incentive when the option for the purchase of a fully charged battery is chosen. The incentive is intended to encourage the consumer to recycle the dispensed fully charged battery using the apparatus 100, when the dispensed battery is used up.

Figure 3A:
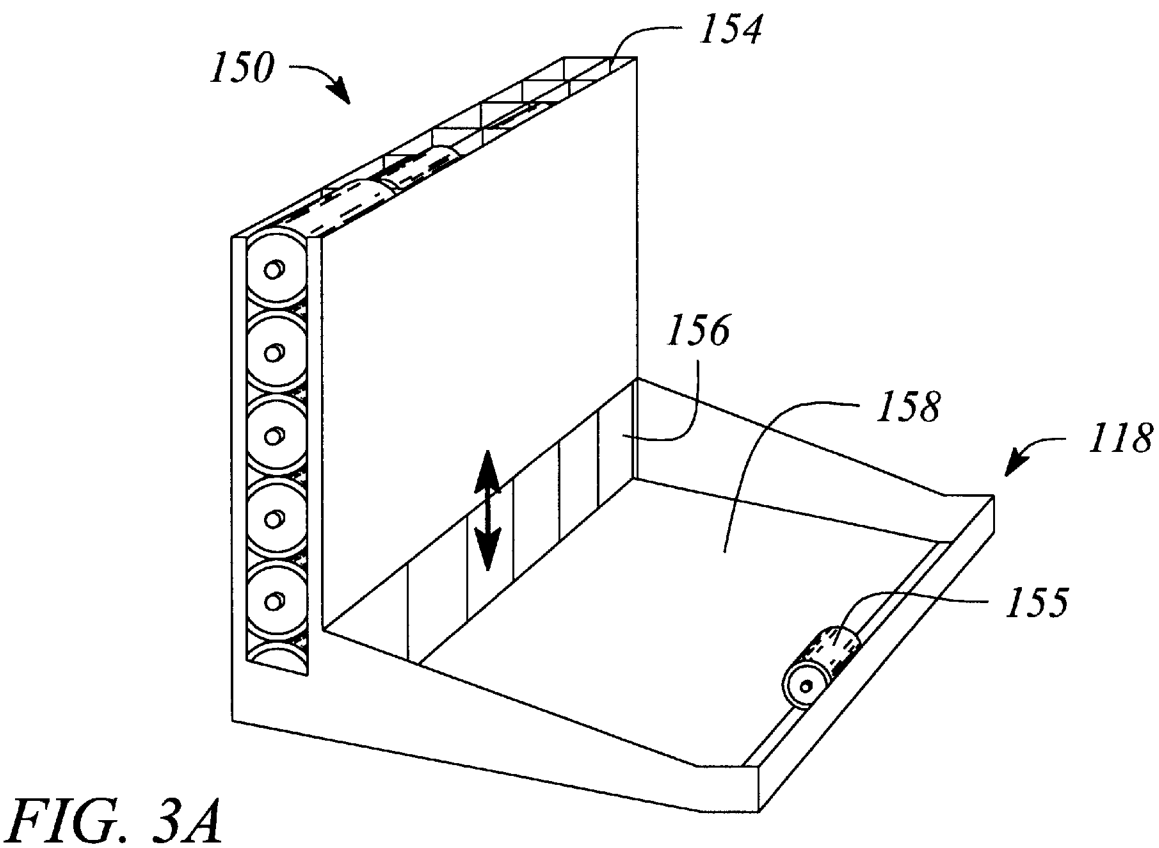
FIG. 3A illustrates a perspective view of an embodiment of a battery dispenser according to the present invention.

FIG. 3A illustrates a perspective view of battery dispenser 150 according to one or more embodiments of the present invention. The battery dispenser 150 has a plurality of dispensing channels or racks 154, in particular, one or more rack per form factor and per battery type. Each different form factor for each of the two battery types (i.e., rechargeable and non-rechargeable) is stored on a separate rack 154. Each rack 154 is separately accessible for dispensing the respective fully charged battery. The racks 154 store the charged batteries in a nominally vertical arrangement. A moveable gate 156 at a bottom end of each rack 154 holds the stacked, charged batteries in each of the respective racks 154.

When the controller 120 communicates with the battery dispenser 150 to dispense a particular battery type and form factor selected by the consumer, the dispenser 150 causes the movable gate 156 of a particular rack 154 corresponding to the selected battery type and form factor to momentarily change position allowing a battery to fall or roll from the bottom of the particular rack. The battery so released then slides or roles down a distribution chute 158 to the battery dispenser port 118 from which the consumer may retrieve the charged battery. The selected, fully charged battery is thus dispensed. The arrows in FIG. 3A illustrate the relative motion of the moveable gate 156 and a representative dispensed battery 155.

The apparatus 100 may provide additional storage within each rack 154 of the battery dispenser 150. Additional storage allows for stock piling each battery type in the apparatus 100, so that the apparatus 100 remains self-contained and self-sufficient for a period of time. Further, the apparatus 100 may further provide controlled access to each tray 154 and any associated storage for convenient restocking of the batteries from time to time.

Figure 3B:
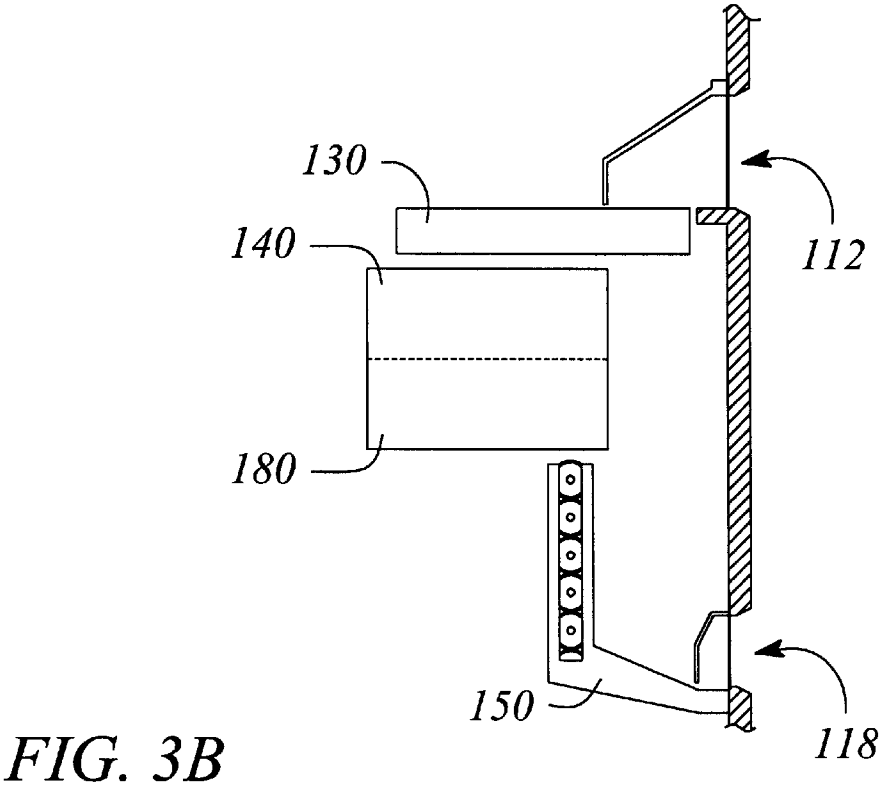
FIG. 3B illustrates a cut-away side view of an embodiment of the apparatus according to the present invention showing the relative locations of an integrated battery receptacle/tester, battery charger, and battery dispenser.

The above-described dispenser 150 is but one possible embodiment of the dispenser 150. One skilled in the art is familiar with a wide variety of dispensing mechanisms such as those used for dispensing candy and canned or bottled sodas. Many of these dispensing mechanisms can be readily adapted to serve as the battery dispenser 150. All such adapted dispensing mechanisms known in the art are within the scope of the present invention. FIG. 3B illustrates a cut-away side view of an embodiment of the apparatus 100 showing the relative locations of a battery receptacle 130, an integrated battery tester/charger 140, 180, and battery dispenser 150 according to the present invention. Both the battery receptacle port 112 and the battery dispensing port 118 at the consumer access point 110 are illustrated also.

Figure 4A:
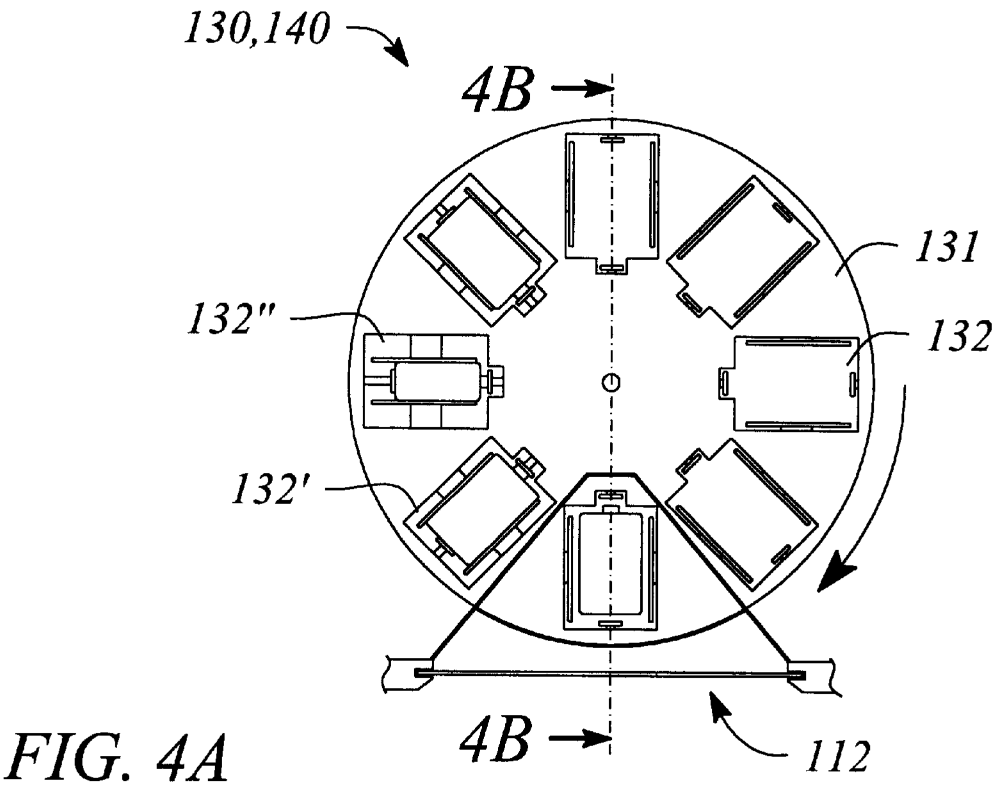
FIG. 4A illustrates a magnified front view of an embodiment of a battery receptacle and port according to the present invention.
Figure 4B:
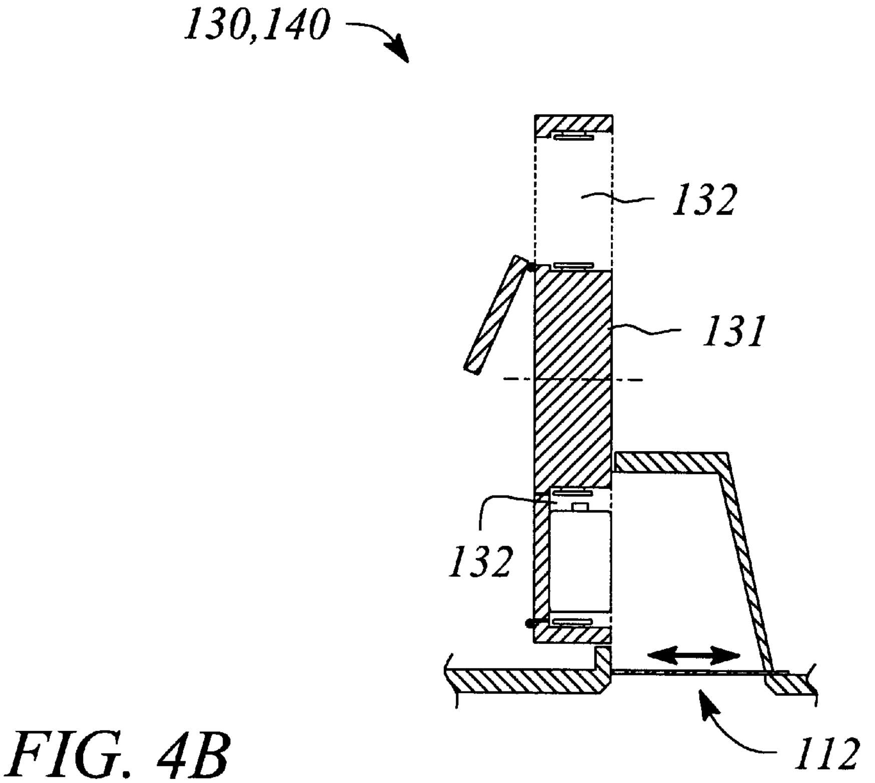
FIG. 4B illustrates a magnified side cross sectional view of the embodiment of the battery receptacle and port of FIG. 4A taken along line 4B—4B.

A magnified top view of an implementation of the battery receptacle 130 with an integrated battery tester 140 and the battery receptacle port 112 is illustrated in FIG. 4A according to one or more embodiments. A magnified side view in cross section of the battery receptacle/tester 130, 140 and port 112 is illustrated in FIG. 4B. When the used battery is deposited at the battery receptacle port 112, the consumer is instructed to insert the battery a particular way or orientation so that the positive terminal and the negative terminal are oriented a particular way for electrical test. Preferably, the battery receptacle port 112 is sized and shaped to prevent insertion of the used battery in any other way but the correct way, so that reliance on consumer understanding is minimized.

Alternatively, the battery receptacle port 112 can accept batteries in a variety of orientations. In these embodiments, either the battery receptacle port 112 or the battery receptacle 130 adjusts the orientation of the battery mechanically to a preferred orientation. In yet another alternative embodiment, the battery receptacle 130 has multiple terminal configurations for accommodating the various potential battery orientations. One skilled in the art can readily devised a number of different battery receptacle 130 and receptacle port 112 configurations that will accommodate reception of inserted batteries. All such configurations are within the scope of the present invention.

The battery receptacle port 112 is ultimately connected to the battery receptacle 130 and therethrough or therein, to the battery tester 140, wherein the battery is tested. FIG. 4A illustrates the integrated battery receptacle/tester 130, 140 as a circular disk 131 with a plurality of slots 132 generically sized to hold both the smallest sized battery and the largest sized battery that the apparatus 100 can accommodate for recycling. For example, once a used battery is deposited and reaches one of the slots 132, the slot adjusts its size until the positive and negative terminals of the inserted battery are contacted for testing. FIG. 4A illustrates a large sized battery in slot 132' and a relatively smaller sized battery in slot 132" with the respective adjustable sides and terminals contacting the inserted used batteries by way of example.

The battery tester 140 associated with the battery receptacle 130 tests the inserted battery. The battery tester 140 identifies the battery chemistry of the inserted battery, and as such, whether the battery is rechargeable or not, and evaluates the condition of the inserted battery. The battery tester 140 identifies the battery chemistry, in part, to assign a credit value to the used battery. For example, batteries of one chemistry may be worth more than those of other chemistries. Certainly, a rechargeable battery is worth more than a non-rechargeable battery, both due to its potential reuse when recharged and its initial cost. In some embodiments, the battery tester 140 is a separate, distinct module of the apparatus 100 and the battery is transferred from the battery receptacle 130 to the battery tester 140. In some other embodiments, the battery tester 140 is integrated into or otherwise associated with the battery charger 180 as illustrated in FIG. 3B. In still some other embodiments, the battery tester 140 is integrated into the battery receptacle 130 as illustrated in FIG. 4A.

There are many different approaches or methods for identifying or determining the type (i.e. form factor and chemistry) of a battery, all of which are within the scope of the present invention. Therefore, in accordance with the invention, the battery tester 140 may have many different forms. For example, the consumer may be asked to input the battery type using the user interface 116 of the consumer access point 110. In this case, the battery tester 140 is used as a consumer input confirmation means. Alternatively, the apparatus 100 may provide for optical scanning of a deposited battery to detect form factor and battery type identifying indicia on the battery. In this case, the battery tester 140 is essentially an optical scanner. Examples of identifying indicia include, but are not limited to, barcodes, brand names, logos, and other typically alpha numeric labeling. Furthermore, the weight of the inserted battery and the specifically shaped receptacle configurations that accommodate a single form factor may also be used to help identify battery type, especially the form factor. In this case, the battery tester 140 is at least a weight and shape sensing device.

Preferably, an electronic approach is employed to determine battery type or chemistry. Using an electronic approach minimizes the possibility of error especially when compared to the alternative of relying on consumer inputs. In this case, the battery tester 140 is a device that electrical tests the deposited used battery. As with the more general problem of identifying battery type, there are many different approaches or methods for battery chemistry identification, all of which are within the scope of the present invention. While there are many methods known in the art, in general, most methods of determining battery chemistry employ a measurement of an electrical characteristic or set of characteristics for the battery under one or more battery load conditions. Data resulting from the measurement are compared to 'known' or predetermined characteristic values for a plurality of battery chemistries. From the comparison, a determination of battery chemistry is made. In a preferred embodiment, the comparison uses a look-up table that stores the characteristics of candidate battery chemistry characteristics.

For example, in one embodiment of determinining battery chemistry, the method comprises measuring the battery voltage in a relatively 'unloaded' or idle condition to produce a measured unloaded battery voltage value. The battery voltage also is measured in a 'loaded' condition to produce a measured loaded battery voltage value. An unloaded condition is defined as a situation wherein the battery is subjected to a low current drain while a loaded condition is defined as a situation wherein the battery is subjected to a moderate to high current drain. As an alternative, a voltage that is proportional to the battery voltage may be measured instead of the actual battery voltage when such a measurement is inconvenient.

This embodiment of the method of determining battery chemistry further comprises computing a battery chemistry coefficient from measured values of the loaded and unloaded battery voltages. One such battery chemistry coefficient is computed by taking a ratio of the measured values of the unloaded and loaded battery voltage. One skilled in the art can readily devise other useful battery chemistry coefficients all of which are within the scope of the method of determining battery 30 chemistry. The main function of the battery chemistry coefficient is to provide a reliable means for distinguishing between various battery chemistries.

The approach to determining battery chemistry according to this example embodiment further comprises comparing the battery chemistry coefficient to a set of candidate battery chemistry coefficients or, more particularly, to a set of battery chemistry coefficient ranges for candidate battery chemistries. Preferably, the coefficient ranges are stored in a look-up table. The comparison of coefficients results in a choice of a particular battery chemistry from among the possible, candidate battery chemistries represented by the coefficient ranges in the look-up table. In essence, the comparison produces a 'best guess' of an actual battery chemistry, the accuracy of which is limited only by an effective discrimination power or capability of the battery chemistry coefficient and the accuracy and applicability of look-up table data.

Preferably, a relative difference in battery load levels between the loaded and unloaded conditions is relatively high. Generally, the greater the difference in load levels, the more reliable will be the results of the battery chemistry determination. According to this embodiment, it is preferred that the look-up table coefficient ranges be generated empirically by the battery tester 140. One skilled in the art is familiar with the construction and use of this sort of empirically derived look-up table. A co-pending patent application of Bean et al., entitled "Battery Fuel Gauging Using Battery Chemistry Identification", Ser. No. 09/943,058, filed Aug. 29, 2001, further describes this approach to battery chemistry identification and is incorporated by reference herein.

As mentioned hereinabove, other methods beyond that described hereinabove for determining battery chemistry are applicable or can be readily adapted to the present invention. For example, Bean et al., U.S. Pat. No. 6,215,275, incorporated herein by reference, discloses an apparatus and method of battery determination or identification that utilizes a simple test circuit in conjunction with a microcontroller that measures several distinct voltages across a battery to determine battery chemistry. In another example, co-pending application of Bean et al., entitled "A Method Of Battery Chemistry Identification Through Analysis Of Voltage Behavior", Ser. No. 09/859,015, filed May 14, 2001, which is incorporated by reference herein, discloses several in situ measurements of battery voltages under various loaded and unloaded battery conditions for battery chemistry determination. These in situ measurement methods may be readily adapted for use in battery chemistry determination by the apparatus 100. The cited methods, as well as any other method that one skilled in the art might devise to determine battery chemistry of a battery, are within the scope of the present invention.

For example, the above-referenced co-pending patent application Ser. No. 09/859,015 describes methods of identifying battery chemistry by monitoring voltage behavior of the battery in response to a stimulus, such as a moderately high load. It has been determined that various battery chemistries behave differently in response to a moderately high load. The most pronounced differences occur immediately after applying or removing the load. The period of time immediately after the application or removal of a load is known as a transient load period. Thus, battery chemistry can be identified or determined with relative accuracy using data collected regarding the battery response to the load during the transient load period.

In one of the methods described in co-pending patent application Ser. No. 09/859,015, battery voltage recovery is monitored after the application of a moderately high load to the battery; and the battery chemistry of the battery is determined from measured voltage recovery data obtained during monitoring. The determination of the battery chemistry according to this method preferably is made by generating a voltage recovery slope value from the measured battery voltage data collected during the step of monitoring. The recovery slope is then compared to a set of reference recovery slope values. More preferably, the determination is made by comparing the recovery slope in conjunction with a measured final recovered voltage to a set of reference recovery slope and final recovered voltage values. The measured final recovered voltage is the highest voltage measured during the recovery period. A best guess of the battery chemistry is then made based on the comparison.

While there is some observed overlap in recovery slope behavior between battery chemistries, especially at some points during discharge, distinctions can be made between the different battery chemistries. For example, the rechargeable NiMH battery chemistry can be distinguished from the non-rechargeable alkaline and high-energy lithium chemistries quite reliably early in the discharge period. Further, the alkaline chemistry can be distinguished from lithium chemistry later in the discharge period.

In another of the methods from co-pending patent application Ser. No. 09/859,015, voltage decline is monitored immediately after the application of a moderately high load to the battery. Preferably, the load has a known and relatively repeatable effect on the battery. Since it has been observed that each battery chemistry behaves differently in response to a moderate or greater drain on the battery, the battery chemistry can advantageously be identified or determined with relative accuracy from monitoring the drain or voltage decline effects with respect to time as a result of the application of the load. The determination of the battery chemistry is made using this method preferably by generating a voltage decline slope value from the measured battery voltage data collected during the step of monitoring. The decline slope is then compared to a set of reference decline slope values. More preferably, the determination is made by comparing the decline slope in conjunction with a measured final depressed voltage to a set of reference decline slope and final depressed voltage values. The measured final depressed voltage is the lowest voltage measured during the decline period. A best guess of the battery chemistry is then made based on the comparison.

While there is some overlap in voltage decline behavior between chemistries during some points during discharge of the battery, distinctions can be made for the different battery chemistries. For example, the rechargeable NiMH battery chemistry can be distinguished from the non-rechargeable alkaline and high-energy lithium chemistries quite reliably over the life of the battery.

In yet another of the methods from co-pending patent application Ser. No. 09/859,015, voltage decline is monitored, starting just as a moderately high load is applied, and then voltage recovery is monitored just after the load is removed. Both a voltage recovery slope and a voltage decline slope are generated from data measured during the monitoring steps. The decline slope and recovery slopes are compared to respective sets of reference slopes and a best guess is made as to battery chemistry. Since each battery chemistry tends to behave differently in response to the application a moderately high load, and then behave differently during subsequent recovery after the load is removed, the battery chemistry of a given battery advantageously can be identified or determined with reasonable accuracy. This method is especially useful for distinguishing rechargeable (NiMH) batteries from non-rechargeable batteries.

The battery tester 140 communicates measured data of the used battery under test to the controller 120. The controller 120 compares the information from the battery tester 140 to predetermined information stored in memory of the controller 120 regarding the battery chemistry, rechargeability and condition. Once the chemistry, rechargeability and condition have been determined, the controller 120 evaluates the credit value of the used battery. For example, the memory comprises a chart or look-up table that correlates a list of the plurality of form factors and a list of the plurality of battery chemistries for each form factor and for both rechargeable and non-rechargeable battery types to predetermined monetary values for each form factor, each battery chemistry and each type.

Generally, alkaline batteries are the most inexpensive batteries while photo lithium ($LiFeS_2$) are the most expensive non-rechargeable battery chemistry to purchase new. New rechargeable batteries initially are more costly than the most expensive non-rechargeable battery chemistry. The monetary credit value assigned to a used battery that will be recycled by the apparatus 100 depends on the initial cost for an equivalent new battery, and other factors, for example, the cost to the owner of the apparatus 100 to dispose of these batteries in the proper manner weighted against any incentive that the owner wants to give the consumer to use the apparatus 100 in the future to buy or recycle batteries. The condition of the used battery also may have an impact on the credit value. For example, a rechargeable battery that is near its lower limit of rechargeability will be worth less than one that is nearer to its upper limit of rechargeability. Other factors also may be considered.

Once a credit value is assigned, the controller 120 displays the credit value on the display 116*a*. The controller 120 further displays the options and choices in the form of inquiries, for example, such as whether the consumer wants the credit value in return; or whether the consumer wants a fully charged replacement battery. Another inquiry that the controller 120 may display is whether the consumer wants a rechargeable or non-rechargeable type replacement battery and/or which form factor. The controller 120 will display a balance due amount for a selected fully charged replacement battery that takes into account the credit value due to the consumer.

The consumer responds to the inquiries using the buttons 116*b*. If the consumer selects credit in return for a deposited used battery, the controller 120 directs the credit dispenser 160 to release a coupon, token or money at the credit dispenser port 119 equivalent to the assigned credit value, for example. If the consumer selects a fully charged replacement battery, and further the type and form factor is selected, the controller 120 will display a balance due amount. The consumer deposits the balance due in the form of money, a token, a coupon, or a credit/debit card at the payment receptacle port 115. The payment receptacle port 115 is connected to the credit receptacle 170. The controller 120 directs the credit receptacle 170 count the amount deposited by the consumer or take the credit/debit card information. If the deposited amount equals the balance due amount, the controller 120 directs the battery dispenser 150 to dispense the battery type and form factor selected by the consumer. The dispensed battery is made available to the consumer at the battery dispenser port 118.

When the controller 120 displays the options or inquiries for the consumer to consider, the controller 120 may further display the incentives mentioned above for reusing the apparatus 100 in the future, and for choosing a rechargeable battery type as a replacement battery, especially when the used battery was non-rechargeable. The incentives can take many forms, such as a discount for repeated use of the apparatus 100, a discount for selecting rechargeable batteries, and discount coupons for merchandise or services, for example. One skilled in the art is familiar with different types of incentives, all of which are within the scope of the present invention.

In a preferred embodiment as mentioned hereinabove, the apparatus 100 still further comprises the battery charger 180, that recharges and reconditions a used rechargeable battery into another fully charged battery that later can be dispensed. Battery chargers including ones that provide reconditioning as well as recharging of a battery are familiar to one skilled in the art. The battery, once tested is transferred from the battery tester 140 to the battery charger 180 for charging if and only if the battery is determined to be a rechargeable battery having some remaining useful life. The battery charger 180 may be a separate, distinct element of the apparatus 100. Alternatively, the battery charger 180 may be integrated with the battery tester 140, as illustrated in FIG. 3B.

In some embodiments, the battery charger 180 may also be used to insure that rechargeable batteries stored by the apparatus remain at a peak or maximum charge level. For example, the battery charger may either periodically charge stored batteries to compensate for loss of battery charge due to self-discharging. Periodic re-charging may be performed at a predetermined charge level during self-discharge or may be performed periodically with respect to an elapsed time from a previous recharging cycle (e.g. daily, weekly, monthly). Alternatively, the battery charger may provide a trickle charge capability to maintain stored rechargeable batteries at a peak charge level. Such a trickle charge capability applies a small amount of current in a more or less continuous manner to the terminals of the battery to compensate for self-discharge related losses in battery charge. Periodic recharging and trickle charging of stored rechargeable batteries are familiar to one of ordinary skill in the art.

Figure 5:
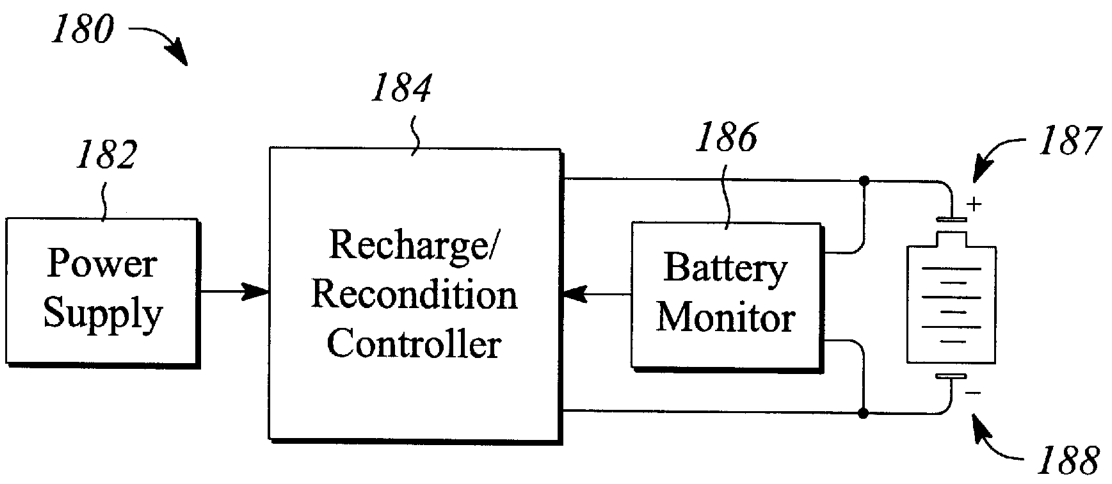
FIG. 5 illustrates a battery charger according to a preferred embodiment of the present invention.
Figure 6:
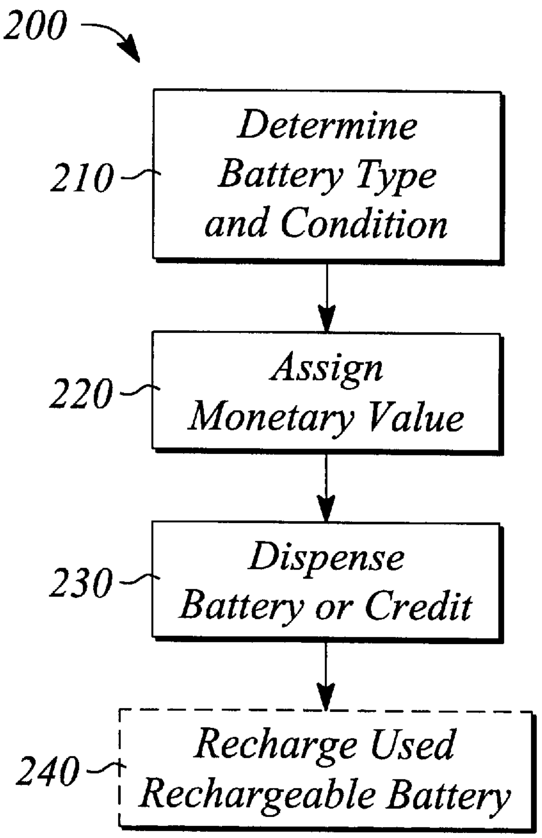
FIG. 6 illustrates a block diagram of a method of recycling a battery according to the present invention.

A block diagram of an embodiment of the battery charger 180 is illustrated in FIG. 5. The battery charger 180 comprises a power supply 182, a recharge/recondition controller 184, a battery monitor 186, a positive terminal 187 and a negative terminal 188. The power supply 182 provides power, typically DC power, to the recharge/recondition controller 184. The recharge/recondition controller 184 regulates the battery charging and reconditioning processes including, but not limited, to controlling current flow to the battery during charge and cyclically charging/discharging the battery to recondition the battery. The recharge/recondition controller 184 has a first output connected to the positive terminal 187 and a second output connected to the negative terminal 188. The battery monitor 186 is connected between the positive 187 and negative 188 terminals. The battery monitor 186 monitors a voltage across the terminals and communicates the monitored voltage to the recharge/recondition controller 184. In many embodiments, the battery monitor 186 and recharge/recondition controller 184 are combined into a single element. A battery connected to the terminals 187, 188 is either recharged or reconditioned and then recharged by current flowing from the recharge/recondition controller 184.

As described hereinabove, the battery is inserted into the battery receptacle 130 via the receptacle port 112. The battery is transferred to the battery tester 140. The battery tester 140 determines the form factor, the battery chemistry, the battery condition, and the rechargeability of the used battery. This information is stored in the controller 120. If the battery is rechargeable, the battery is then transferred to the battery charger 180. The controller 120 directs the battery charger 180 to charge those used batteries that the battery tester 140 had determined to be rechargeable, and further monitors the recharge/reconditioning cycle. The controller 184 may be a part of the controller 120 for the apparatus 100 or a separate controller 184 in communication with the controller 120. Fully recharged batteries can be manually collected from the battery charger 180 and sorted into the appropriate trays 154 of the battery dispenser 150 according to form factor for later dispensing along with the other fully charged batteries. Alternatively, the fully recharged batteries can be transferred into the battery dispenser 150 automatically by direction of the controller 120. Once the used rechargeable battery is recharged by the battery charger 180, the controller 120 directs the fully recharged battery to the battery dispenser 150 where it is stored in an appropriate battery tray 154 with the other fully charged rechargeable batteries according to its determined form factor.

The apparatus 100 further stores the used non-rechargeable batteries and used rechargeable batteries, which have exceeded their useful rechargeable life, that were deposited in the apparatus 100 by consumers. These used batteries are periodically removed from the apparatus 100 for proper disposal according to the rules and regulations of the area in which the apparatus 100 is located. The apparatus 100 essentially provides a convenient collection station for used batteries that ultimately reduces the number of used batteries that inappropriately end up in landfills.

The controller 120 of a preferred embodiment of the apparatus 100 comprises microprocessor or microcontroller, a memory, and a computer program. The computer program resides in the memory as either firmware or software. The computer program is executed by the microprocessor or microcontroller. The computer program implements instructions that, when executed by the controller determines battery chemistry, rechargeability and condition of the used battery. The program also implements instructions that compute the assigned credit value. Preferably, the credit values are predetermined and stored in the memory as a look-up table and are as defined hereinabove. The computer program further implements instructions that calculate the balance due amount based on the selected fully charged battery type and form factor, and count any money, tokens or coupons deposited or records pertinent information from any credit/debit card inserted at the payment receptacle port 115. The instructions that count deposited money, further count the deposited balance due amount, before the controller 120 directs the battery dispenser 150 to dispense the selected battery.

In another aspect of the invention, a method 200 of recycling a battery is provided. The method comprises determining battery type and condition 210 of a deposited battery. Battery type includes battery form factor and battery chemistry. The step of determining type and condition 210 preferably comprises electrically testing the battery to determine battery chemistry, rechargeability and condition of the used battery. Battery chemistry may be determined using any of the methods known in the art including, but not limited to, those described and cited hereinabove. The step of determining 210 alternatively includes optically scanning indicia on the battery or measuring size and weight of the deposited battery, depending on the embodiment.

The method 200 further comprises assigning 220 a credit value to the tested used battery, and dispensing 230 a form of credit. The step of dispensing 230 a form of credit comprises providing options and choices for the form of dispensed credit. In some embodiments, one of the options that is provided is a choice between dispensing the credit in the form of a refund and applying the credit to a purchase of a fully charged battery that is subsequently dispensed. The refund can be in the form of money, tokens or coupons, for example. Money may take the form of one or more of cash, a coupon redeemable for cash or merchandise, or an electronic transfer to an account of the consumer such as through the use of a credit/debit card account.

The choice of purchasing the fully charged battery includes a choice among different form factors of a selection of fully charged batteries. In some of these embodiments, the selection of fully charged batteries comprises a choice among only rechargeable battery types. In others of these embodiments, the selection of fully charged batteries comprises a choice between one or both of rechargeable and non-rechargeable battery types. Where a choice between both battery types is provided, the method optionally further comprises providing an incentive for the choice of a rechargeable battery over a non-rechargeable battery. The step of dispensing 230 further comprises notifying of and receiving a balance due amount when the option to purchase the fully charged battery is chosen.

As mentioned above, the fully charged battery that is dispensed 230 can be a non-rechargeable battery or a rechargeable battery, depending on the embodiment. Preferably, the dispensed 230 fully charged battery is a rechargeable type battery to encourage a consumer to use rechargeable type batteries. Rechargeable type batteries are more environmentally friendly compared to non-rechargeable batteries, simply due to their repeated reuse.

Also, the method 200 may further comprise providing an incentive to recycle a used battery in the future according to the method 200. This incentive may be in the form of money, a discount for a selected battery, or a discount or a coupon for other merchandise or services.

In a preferred embodiment, the method 200 still further comprises recharging and reconditioning 240 the tested used battery, when it is determined 210 that the tested battery is rechargeable. The recharged and conditioned 240 battery can be reused as another fully charged battery that is later dispensed 230. In some embodiments, the step of recharging and reconditioning 240 maintains a peak or maximum charge level on stored rechargeable batteries through periodic recharging or through trickle charging.

The type of used battery is determined 210, such as the battery chemistry, rechargeability and condition, according to that described above for the apparatus 100. Further, ways that a credit value can be assigned 220 to the tested used battery are described above. The options provided by the method 200 are chosen by the consumer whom deposited the used battery for determination 210. When the fully charged battery option is chosen by the consumer, the consumer chooses the battery type and form factor, and deposits the corresponding balance due amount. The balance due amount is received in the step of dispensing 230. The incentives mentioned above are optionally provided during the selection process before or during the step of dispensing 230.

Advantageously, the present invention provides convenient battery recycling that includes both battery disposal and battery reuse, makes the purchase and use of rechargeable batteries more affordable, and provides for the proper disposal of used, non-rechargeable batteries.

Thus there have been described a novel apparatus 100 for and method 200 of battery recycling. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. An apparatus for recycling a used battery comprising:

a receptacle that receives one or both of the used battery and a payment;

a dispenser that dispenses one or both of a fully charged battery and a credit amount for the received used battery;

a controller that monitors the receptacle and controls the dispenser; and a plurality of consumer options comprising a choice of the fully charged battery or the credit amount for the received used battery and choices of one or both of a battery form factor and a battery type, when the fully charged battery is chosen.

2. The apparatus of claim 1, further comprising a battery tester that measures a characteristic of the used battery, and wherein the controller comprises a computer program that implements instructions that determine one or more of chemistry, rechargeability and condition of the used battery from the measured characteristic, and that assign a credit value to the used battery based on the one or more determined chemistry, rechargeability and condition.

3. The apparatus of claim 2, further comprising a battery charger, the battery charger recharging the used battery when the used battery is determined to be a rechargeable type battery, wherein the controller further controls the battery charger.

4. An apparatus for recycling a used battery comprising:

a consumer access point where a consumer deposits the used battery;

a battery tester that measures an electrical characteristic of the deposited used battery to determine battery type and condition;

a dispenser that dispenses a form of credit, a value of the credit being based on the determined battery type and condition; and a controller that controls the battery tester and the dispenser, and that comunununicates with the consumer at the consumer access point.

5. The apparatus of claim 4, wherein the dispenser comprises one or both of a battery dispenser and a credit dispenser, the battery dispenser comprising a fully charged battery in a plurality of form factors, the credit dispenser comprising one or more of money, tokens and coupons, the dispenser being capable of dispensing one or both of the fully charged battery and a credit amount as the form of credit.

6. The apparatus of claim 4, wherein the consumer access point comprises a user interface and a plurality of ports, both the user interface and the plurality of ports being accessible to the consumer, the controller using the user interface to communicate with the consumer, the plurality of ports comprising a dispenser port connected to the dispenser and a receptacle port associated with the battery tester.

7. The apparatus of claim 6, wherein the receptacle port comprise one or both of a battery receptacle port associated with the battery tester and a payment receptacle port associated with a credit receptacle, the consumer using the battery receptacle port to deposit the used battery, and the consumer using the payment receptacle port to purchase a fully charged battery.

8. The apparatus of claim 4, further comprising a plurality of consumer options, a first option being a choice between a fully charged battery and credit from the dispenser in exchange for the deposited used battery, and a second option being a choice of form factor when the fully charged battery is chosen in the first option.

9. The apparatus of claim 8, further comprising a third option, wherein the third option is a choice between a rechargeable type battery and a non-rechargeable type battery, when the fully charged battery is chosen in the first option.

10. The apparatus of claim 4, wherein the dispenser comprises a fully charged battery in a plurality of form factors, the dispenser dispensing one or both of a rechargeable type fully charged battery and a non-rechargeable type fully charged battery.

11. The apparatus of claim 4, wherein the apparatus recycles one or both of a rechargeable type used battery and a non-rechargeable type used battery.

12. The apparatus of claim 4, further comprising an incentive to use the apparatus to recycle the used battery.

13. The apparatus of claim 9, further comprising an incentive to choose a rechargeable fully charged battery in the third option.

14. The apparatus of claim 4, further comprising a battery charger associated with the battery tester, the battery charger recharging the used battery when the battery tester determines that the used battery is rechargeable.

15. The apparatus of claim 5, further comprising a battery charger associated with the battery dispenser, the battery charger recharging the used battery when the battery tester determines that the used battery is rechargeable, and the recharged used battery being another fully charged battery that can be dispensed by the battery dispenser as the form of credit.

16. The apparatus of claim 4, wherein the controller comprises a computer program, the computer program implementing instructions that, when executed by the controller, determine the battery type and condition of the deposited used battery from the electrical characteristic measured by the battery tester, and assign the credit value to the tested used battery based on the determined battery type and condition of the tested used battery.

17. The apparatus of claim 4, wherein the consumer access point, the battery tester, the dispenser and controller are contained together in a self-contained station or kiosk that provides convenience to the consumer.

18. A method of recycling a used battery comprising:

determining a battery type and condition of the used battery by measuring an electrical characteristic of the used battery;

assigning a credit value to the used battery based on the determined battery type and condition; and dispensing a form of credit based on the assigned credit value.

19. The method of claim 18, further comprising recharging the used battery when the used battery is determined to be rechargeable, and further dispensing the recharged battery as the form of credit.

20. The method of claim 18, wherein dispensing comprises choosing between a fully charged battery and the credit value as the form of credit; choosing a battery form factor when the fully charged battery is chosen; and choosing one or more of money, tokens or coupons in an amount equivalent to the credit value when the credit value is chosen.

21. The method of claim 20, wherein dispensing further comprises choosing between a rechargeable type battery and a non-rechargeable type battery, when the fully charged battery is chosen.

22. The method of claim 21, further comprising providing an incentive to choose the rechargeable type fully charged battery instead of the non-rechargeable type battery during the step of dispensing.

23. The method of claim 18, wherein one or both of used rechargeable type batteries and used non-rechargeable type batteries can be recycled.

24. The method of claim 18, further comprising collecting the used battery, wherein the collected used battery is either reused or disposed of according to regulations.

25. The method of claim 18, further comprising providing an incentive to recycle the used battery.

26. The method of claim 18, wherein determining, assigning and dispensing are performed together in a self-contained station or kiosk that provides convenience to the consumer.

27. The method of claim 21, further comprising maintaining a charge on stored rechargeable type batteries.

* * * * *